(12) United States Patent
Fukudome et al.

(10) Patent No.: US 6,297,184 B1
(45) Date of Patent: Oct. 2, 2001

(54) SINTERED PRODUCT OF SILICON NITRIDE

(75) Inventors: Takero Fukudome; Masahiro Sato; Katsushi Sakaue, all of Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/510,392

(22) Filed: Feb. 22, 2000

(51) Int. Cl.$^7$ ................................ C04B 35/587
(52) U.S. Cl. ................................ 501/97.2
(58) Field of Search ........................ 501/97.2

(56) References Cited

U.S. PATENT DOCUMENTS 5,200,374 * 4/1993 Yamada et al. ............... 501/98.2
5,780,374 * 7/1998 Kawai et al. ................. 501/97.1
5,804,523 * 9/1998 Oda et al. .................... 501/97.2

* cited by examiner

*Primary Examiner*—Karl Group
(74) *Attorney, Agent, or Firm*—Hogan & Hartson, L.L.P.

(57) ABSTRACT

A sintered product of silicon nitride has a crystal phase of $RE_2Si_3N_2O_5$ or $RE_3AlSi_2O_7N_2$ (RE is an element of the Group 3a of periodic table) precipitated on the grain boundaries of the silicon nitride crystal phase, and exhibits a high strength over a wide temperature region of from normal temperature to a temperature of as high as 1000° C., as well as excellent oxidation resistance and static fatigue property. The sintered product of silicon nitride is very useful as parts for heat engines, such as parts for engines and parts for gas turbines.

13 Claims, 1 Drawing Sheet

SINTERED PRODUCT OF SILICON NITRIDE

BACKGROUND OF THE INVENTION

1. Field of the Invention

The present invention relates to a sintered product of silicon nitride that can be favorably used as parts for heat engines, such as parts of engines and parts of gas turbines. More specifically, the invention relates to a sintered product of silicon nitride having a high strength over a wide temperature range of from normal temperature to high temperatures, and exhibiting excellent static fatigue property and oxidation resistance.

2. Description of the Prior Art

The sintered product of silicon nitride has a high strength and has heretofore been drawing attention as a material that exhibits excellent heat resistance, resistance against thermal shock and oxidation resistance. Therefore, study has been forwarded to use the sintered product of silicon nitride as parts for heat engines, such as engineering ceramics and, particularly, as parts for gas turbines and engines, as well as for automotive parts.

The silicon nitride itself is a material that can be difficultly sintered. Accordingly, a highly dense and highly strong sintered product of silicon nitride has been obtained by mixing a sintering additive such as an oxide of a rare earth element, aluminum oxide or magnesium oxide into the silicon nitride, and firing the mixture. For example, a mixture powder is prepared by adding the sintering additive to the powder of silicon nitride, and is molded into a predetermined shape, followed by firing in a non-oxidizing atmosphere such as of nitrogen at a temperature of from 1600 to 2000° C. to prepare a sintered product of silicon nitride.

In a nitrogen atmosphere under normal pressure, the silicon nitride undergoes the decomposition at a temperature of higher than 1800° C. Usually, therefore, the silicon nitride is fired in a pressurized nitrogen atmosphere while suppressing the decomposition of the silicon nitride, thereby to realize the firing at a high temperature and to obtain a sintered product of silicon nitride featuring excellent strength at high temperatures.

Further, it has been known to obtain a sintered product of silicon nitride having excellent strength at high temperatures by crystallizing the sintering additive present on the grain boundaries of the silicon nitride crystal phase, so that: crystal phases such as melillite ($RE_2O_3 \cdot Si_3N_4$) and wollastonite ($RESi_2N$) are precipitated on the grain boundaries and that the heat resistance is heightened on the grain boundaries.

However, the above-mentioned conventional sintered product of silicon nitride has problems as described below.

By using, for example, an oxide of a rare earth element, aluminum oxide or magnesium oxide as a sintering additive, it is allowed to prepare a highly dense sintered product which exhibits increased strength at normal temperature. The sintering additive has a low melting point enabling the firing to be conducted at low temperatures. It is therefore allowed to suppress the growth of silicon nitride particles during the firing and, hence, to further increase the strength of the sintered product at normal temperature. However, since the sintering additive has a low melting point, the grain boundary phase in the sintered product is softened even at low temperatures. Accordingly, the sintered product may exhibit increased strength at normal temperature but exhibits decreased strength at high temperatures.

Further, when the sintered product of silicon nitride is to be prepared by firing at a high temperature based on the pressurized sintering, the sintered product may exhibit increased strength at high temperatures making, however, it difficult to control the growth of silicon nitride particles, and increased strength cannot be expected at normal temperature.

In a sintered product of silicon nitride precipitating the crystal phases such as melillite and wollastonite on the grain boundaries, further, the grain boundary phase is softened in a suppressed manner at high temperatures and, hence, an increased strength is exhibited at high temperatures. This sintered product can be produced while controlling the growth of silicon nitride particles, and a large strength is exhibited at normal temperature. This sintered product does not undergo creep deformation or creep destruction since the grain boundary phase is suppressed from being softened, but develops a static fatigue due to sub-critical crack growth (hereinafter referred to as SCG) without accompanied by deformation, arousing a problem in that the time to failure is shortened at high temperatures. Besides, since the crystal phases precipitated on the grain boundaries have poor resistance against the oxidation, the grain boundary phase is preferentially oxidized, deteriorating corrosion resistance in a high-temperature oxidizing atmosphere.

SUMMARY OF THE INVENTION

The object of the present invention, therefore, is to provide a sintered product of silicon nitride exhibiting a high strength over a wide temperature range of from normal temperature to a high temperature (e.g., 1000° C.), and featuring excellent static fatigue property and oxidation resistance.

According to the present invention, there is provided a sintered product of silicon nitride comprising a silicon nitride crystal phase, wherein a crystal phase of $RE_2Si_3N_2O_5$ or $RE_3AlSi_2O_7N_2$ (RE is an element of the Group 3a of periodic table) is precipitated on the grain boundaries of the silicon nitride crystal phase.

That is, since the crystal phase of $RE_2Si_3N_2O_5$ or $RE_3AlSi_2O_7N_2$ is precipitated on the grain boundaries of the silicon nitride crystal phase, the sintered product of the invention exhibits a high strength over a wide temperature region of from normal temperature to a high temperature, and excellent oxidation resistance and static fatigue property.

In the present invention, further, a crystal phase of a nitride, carbide or silicide of at least one kind of element selected from the group consisting of W, Mo, Cu, Mn, Fe and Nb is precipitated on the grain boundaries of the silicon nitride crystal phase, in addition to the above-mentioned crystal phases, in order to further increase the strength and to improve the abrasion resistance. Further, the crystal phase of $Al_2RE_4O_9$ is precipitated to further improve the oxidation resistance.

Figure 1:
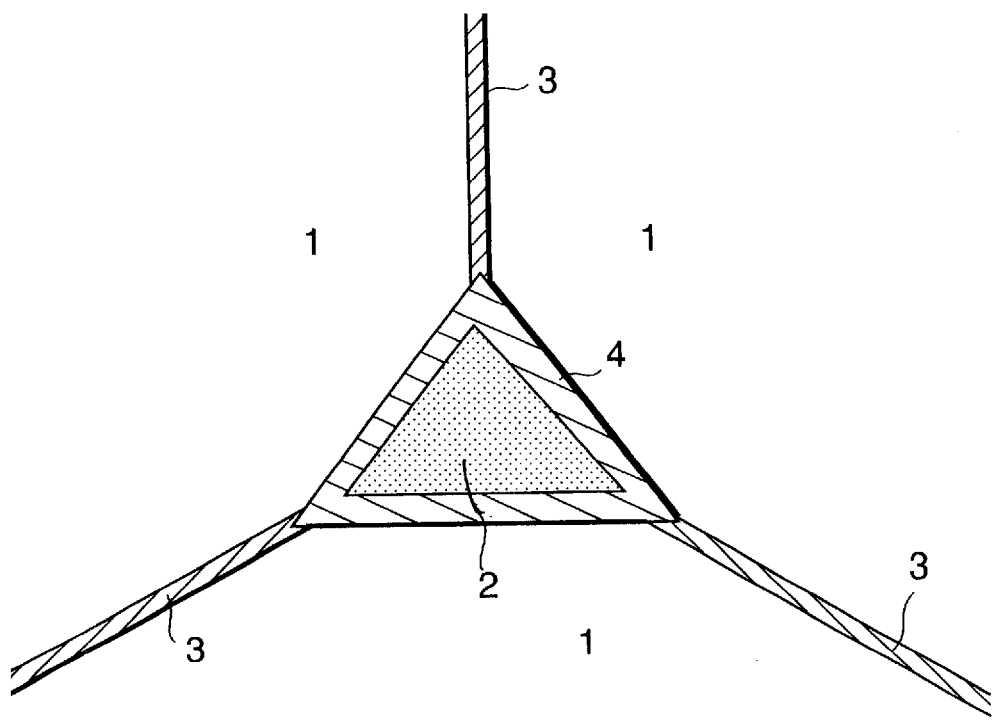
FIG. 1 is a diagram schematically illustrating the crystal structure of a sintered product of silicon nitride of the present invention.

DETAILED DESCRIPTION OF THE INVENTION (Crystal structure of the sintered product)

Referring to FIG. 1, the sintered product of silicon nitride of the invention includes a main crystal phase 1 of silicon nitride. On the grain boundaries of the main crystal phase 1 are formed a crystal phase (grain boundary crystal phase) 2 and amorphous phases (grain boundary amorphous phases) 3 and 4. The grain boundary amorphous phase 3 exists between the main crystal phases 1, and the grain boundary amorphous phase 4 exists between the main crystal phase 1 and the grain boundary crystal phase 2.

As the silicon nitride constituting the main crystal phase 1, the β-silicon nitride can be favorably used. From the standpoint of increasing the strength to be not lower than 850 MPa under high-temperature conditions, it is desired that the main crystal phase 1 has an average particle length of not larger than 50 μm and, particularly, not larger than 30 μm.

Due to a sintering additive used for producing the sintered product, amorphous phases 3 and 4 containing elements such as an element (RE) of the Group 3a of periodic table, silicon (Si), aluminum (Al) and oxygen (O) are formed on the grain boundaries of the main crystal phase 1. In the present invention, a distinguished feature resides in the precipitation of the crystal phase (grain boundary crystal phase 2) of $RE_2Si_3N_2O_5$ or $RE_3AlSi_2O_7N_2$ on the grain boundaries.

The causes of deterioration in the static fatigue property of the sintered product of silicon nitride can be roughly divided into creep deformation and SCG (sub-critical crack growth). As described already, the creep deformation can be decreased by crystallizing the grain boundary phase in the sintered product of silicon nitride. The SCG is caused by cavities formed in the sintered product due to residual stress stemming from the difference in the mechanical strength, thermal stability and chemical stability of the grain boundary phase, due to the difference in the coefficient of thermal expansion between the silicon nitride crystal phase and the grain boundary phase, and due to chemical affinity between the silicon nitride crystal phase and the grain boundary phase.

In the present invention, $RE_2Si_3N_2O_5$ or $RE_3AlSi_2O_7N_2$ is precipitated as the grain boundary crystal phase 2, effectively suppressing the creep deformation and effectively suppressing the formation of cavities that cause the occurrence of SCG. That is, when the sintered product of silicon nitride of the invention precipitating the grain boundary crystal phase 2 is subjected to the experiment (appearing later) for evaluating the static fatigue property and is broken, an observation of the vicinity of the broken surface through a transmission-type electron microscope (TEM) shows that the formation of cavities that cause SCG has been effectively suppressed. As described above, the sintered product of silicon nitride of the invention has a particular property of effectively suppressing the formation of cavities making it, therefore, possible to effectively prevent the creep deformation and to effectively prevent the occurrence of SCG, exhibiting very excellent static fatigue property. For example, in the conventional sintered product in which the melillite or wollastonite crystal phase is precipitated on the gra-in boundaries of the silicon nitride crystal phase, the formation of cavities that causes SCG is not suppressed and, hence, the static fatigue property is not satisfactory.

The crystal phase of $RE_2Si_3N_2O_5$ or $RE_3AlSi_2O_7N_2$ is thermally and chemically stable compared with the melillite and wollastonite. Therefore, the sintered product of silicon nitride of the invention containing the grain boundary crystal phase 2 does not permit the grain boundary phase to be preferentially oxidized, and exhibits excellent resistance against the oxidation.

In order that the above-mentioned grain boundary crystal phase 2 of $RE_2Si_3N_2O_5$ or $RE_3AlSi_2O_7N_2$ is precipitated, the sintered product of silicon nitride of the invention contains an element (RE) of the Group 3a of periodic table and aluminum stemming from the sintering additive and further contains an excess amount of oxygen (which will be described later in detail). Therefore, the sintered product can be prepared by firing at a relatively low temperature, and the growth of the silicon nitride particles can be easily controlled. Thus, the present invention makes it possible to obtain a sintered product having a high strength at normal temperature.

With the grain boundary crystal phase 2 being precipitated as described above, the grain boundary phase is suppressed from softening at high temperatures. Accordingly, the sintered product of the invention exhibits a high strength at a high temperature of, for example, 1000° C.

Formation of the grain boundary crystal phase 2 of $RE_2Si_3N_2O_5$ or $RE_3AlSi_2O_7N_2$ in the sintered product of silicon nitride of the present invention can be confirmed by the X-ray diffraction. In the X-ray diffraction image, further, it is desired that the intensity ratio (β/α) of the peak intensity (β) of $RE_2Si_3N_2O_5$ (211) or $RE_3AlSi_2O_7N_2$ (102) to the peak intensity (α) of $Si_3N_4$ (200) is not smaller than 0.01, preferably, not smaller than 0.1 and, most preferably, not smaller than 0.2. When the peak intensity ratio (β/α) lies within the above-mentioned range, the grain boundary crystal phase 2 is precipitated conspicuously to markedly improve the oxidation resistance, static fatigue property and strength.

The X-ray diffraction is measured by the step scanning under the following conditions by using an X-ray diffraction apparatus manufactured by Rigaku Denki Co., and heights of the peaks are calculated as values obtained by subtracting the background from the maximum heights.

X-ray Diffraction Measurement Conditions

Bulb: Cu
Bulb voltage: 50 kV
Bulb current: 200 mA
Vertical goniometer: biaxial
Width of step: 0.02°
Measuring time: 0.05 sec.

The spacing of $RE_2Si_3N_2O_5$ (211) is 2.777 Å, and the spacing of $RE_3AlSi_2O_7N_2$ (102) is 2.783 Å. The two are very close to each other, exhibiting peaks near 36° (2θ), and are often overlapped one upon the other to exhibit a single peak. In the present invention, however, the effect of precipitation of the crystal phase is exhibited to a sufficient degree provided a single overlapped peak has a height of not lower than 1% of the peak of $Si_3N_4$ (200). Therefore, the peak intensity ratio (β/α) may be calculated by using the single peak only.

According to the present invention, further, the crystal phase (hereinafter often referred to as hard crystal phase) of a nitride, carbide or silicide of at least one element selected from the group consisting of W, Mo, Cu, Mn, Fe and Nb is desirably precipitated as the grain boundary crystal phase 2 in addition to the above-mentioned crystal phase of $RE_2Si_3N_2O_5$ or $RE_3AlSi_2O_7N_2$. That is, the crystal particles of the nitride, carbide or silicide of the above-mentioned element have been known as hard particles. Upon precipitating the hard crystal phase comprising the hard particles on the grain boundaries of the main crystal phase 1, it is allowed to increase the hardness of the sintered product and to improve abrasion resistance of the sintered product. As the hard crystalline particles, there can be desirably used $WSi_2$, $Cu_2Si$, $FeSi_2$ and NbC. It is further desired that the hard crystal particles have an average particle diameter of not larger than 3 μm and, particularly, not larger than 1 μm. The hard crystal phase of such fine particles can be uniformly precipitated on the grain boundaries over the whole sintered product not only to improve the abrasion resistance of the sintered product but also to further increase the strength of the sintered product.

In the present invention, further, the crystal phase of $Al_2RE_4O_9$ (hereinafter often referred to as anti-oxidizing crystal phase) can be precipitated as the grain boundary crystal phase 2. The anti-oxidizing crystal phase contains no nitrogen and, hence, exhibits excellent oxidation resistance compared to the above-mentioned crystal phases of $RE_2Si_3N_2O_5$ and $RE_3AlSi_2O_7N_2$. From the standpoint of improving the oxidation resistance of the sintered product, therefore, it is advantageous to precipitate the anti-oxidizing crystal phase as the grain boundary crystal phase together with the above-mentioned various crystal phases.

Referring to FIG. 1, in the sintered product of the invention, the grain boundary crystal phase 2 of the above-mentioned various crystal particles is precipitating on the grain boundaries of the main crystal phase 1 of silicon nitride. Here, in particular, it is desired to decrease the thickness of the grain boundary amorphous phases 3 and 4 as small as possible. The grain boundary amorphous phases 3 and 4 are easily softened at a temperature of abut 1000° C., and easily form cracks due to the external stress, the cracks easily developing. Accordingly, the grain boundaries of the main crystal phase 1 are crystallized to a sufficient degree, to decrease the thicknesses of the grain boundary amorphous phases 3 and 4 as small as possible in order to improve mechanical properties of the sintered product under high-temperature conditions. Concretely, the average thickness of the grain boundary amorphous phase 3 existing between the main crystal phases 1 is set to be not larger than 2 nm and, particularly, not larger than 1 nm, and the average thickness of the grain boundary amorphous phase 4 existing between the main crystal phase 1 and the grain boundary crystal phase 2 is set to be not larger than 5 nm and, particularly, not larger than 3 nm. Then, as will be demonstrated by an experiment appearing later, the strength of the sintered product at high temperatures can be increased to be not smaller than 800 MPa, and the time to failure under the stress of 700 MPa in air at 1000° C. can be remarkably improved to more than 100 hours.

The average thicknesses of the grain boundary amorphous phases 3 and 4 can be calculated as average values by measuring the thicknesses of the grain boundary crystal phases 3 and 4 at several points from a photograph of crystals shot by using a transmission-type electron microscope (TEM).

In the present invention, the grain boundary crystal phase of $RE_2Si_3N_2O_5$ or $RE_3AlSi_2O_7N_2$ and the hard crystal phase or the anti-oxidizing crystal phase that may be precipitated on the grain boundaries, may contain other elements in the form of a solid solution in the crystal particles.

It is desired that the sintered product of silicon nitride of the invention has a relative density of not smaller than 99% and, particularly, not smaller than 99.5%. The sintered product having such a density contains little pores, has a small surface area and, hence, exhibits a further increased strength at high temperatures and improved oxidation resistance.

(Composition of the sintered product)

The sintered product of silicon nitride of the present invention has a crystal phase of $RE_2Si_3N_2O_5$ or $RE_3AlSi_2O_7N_2$ as a grain boundary crystal phase 2 and, hence, contains an element (RE) of the Group 3a of periodic table and aluminum in addition to silicon nitride (particularly, β-silicon nitride).

It is necessary that the silicon nitride is contained by not less than 80% by weight. When the content of the silicon nitride is smaller than 80% by weight, the sintered product of silicon nitride loses its inherent strength and abrasion resistance.

As the element (RE) of the Group 3a of periodic table, there can be exemplified Y, Ce, Er, Yb, Lu and Sm, which may be present in a single kind or in two or more kinds in the sintered product. Though there is no particular limitation on the kind of RE, Y is most desired since it is cheaply available. It is desired that the RE is present in the sintered product in an amount of from 2 to 14% by weight calculated as an oxide (as $RE_2O_3$) and, particularly, in an amount of from 4 to 8% by weight. When the RE content lies within the above-mentioned range, the crystal phase having poor oxidation resistance such as of melillite ($RE_2O_3 \cdot Si_3N_4$) or wollastonite ($RESi_2N$) is prevented from precipitating on the grain boundaries and, instead, the crystal phase of the above-mentioned $RE_2Si_3N_2O_5$ or $RE_3AlSi_2O_7N_2$ easily precipitates on the grain boundaries. Besides, a densely sintered product is easily obtained upon the firing at a low temperature.

It is further desired that aluminum is contained in the sintered product in an amount of from 2 to 5% by weight and, particularly, from 2.5 to 4% by weight calculated as an oxide. When the aluminum content lies within this range, the grain boundary phase is easily crystallized and the eintering property is enhanced at low temperatures. In order to crystallize the grain boundary phase to a sufficient degree, it is desired that the ratio ($Al_2O_3/RE_2O_3$) of the content of aluminum to the content of the element of the Group 3a of periodic table is from 0.2 to 0.8 and, particularly, from 0.25 to 0.75.

It is further desired that the sintered product of the invention contains an excess of oxygen in addition to the above-mentioned silicon nitride, element (RE) of the Group 3a of periodic table and aluminum. An excess of oxygen may include oxygen component stemming from $SiO_2$ mixed as an unavoidable impurity into the silicon nitride powder that is used as a starting material and oxygen component stemming from $SiO_2$ that is added as required. Therefore, the content of the excess of oxygen corresponds to the oxygen component that remains when the oxide ($RE_2O_3$) of the element of the Group 3a of periodic table and oxygen component (inclusive of oxygen component in the oxide of a hard metal constituting the hard crystal phase) in the $Al_2O_3$ contained in the sintered product are subtracted from the whole amount of oxygen in the sintered product. In the sintered product of the invention, it is desired that such an excess of oxygen is contained in an amount of from 0.5 to 5% by weight and, particularly, from 1.5 to 3.5% by weight calculated as $SiO_2$, thereby to effectively suppress the precipitation of the crystal phase such as disilicate or monosilicate of the element of the Group 3a of periodic table. When the silicate crystal phase precipitates as described above, an aluminum-rich amorphous film is formed between the main crystal phase 1 and the grain boundary crystal phase 2. The amorphous film deforms at high eftilperatures to deteriorate the static fatigue property. By adjusting the excess amount of oxygen as described above, it is allowed to prevent the static fatigue property from being deteriorated by the formation of the amorphous film. From the standpoint of preventing the deterioration in the static fatigue property (i.e., from the standpoint of preventing the formation of the aluminum-rich amorphous film), it is desired that the ratio ($SiO_2/RE_2O_3$) of the excess amount of oxygen calculated as $SiO_2$ to the amount of the element (RE) of the Group 3a of periodic table calculated as $RE_2O_3$ is from 0.2 to 0.75 and, particularly, from 0.25 to 0.65.

When the above-mentioned hard crystal phase is formed on the grain boundaries, it is desired that the sintered product of the invention contains the element constituting the above crystal phase, i.e., contains W, Mo, Cu, Mn, Fe or Nb in an amount of from 0.5 to 5 parts by weight and, particularly, from 0.6 to 3 parts by weight per 100 parts by weight of the total amount of the above-mentioned silicon nitride, element of the Group 3a of periodic table, aluminum and excess of oxygen. When these elements are contained within the above-mentioned range, the sintered product precipitates the hard crystal phase in a sufficiently large amount without losing density, from which improved abrasion resistance and improved static fatigue property can be expected.

The contents of these elements are calculated as oxides. For example, an oxide of W is calculated as $WO_3$, an oxide of Mo is calculated as $MoO_3$, an oxide of Cu is calculated as $Cu_2O$, an oxide of Mn is calculated as $MnO_2$, an oxide of Fe is calculated as $Fe_2O_3$, and an oxide of Nb is calculated as $Nb_2O_5$.

The sintered product of the invention may contain, in addition to the above-mentioned various elements, metals in the form of dispersed particles or whiskers in a total amount of not larger than 5% by weight.

(Preparation of the sintered product)

The sintered product of the invention having the above-mentioned crystal structure and composition is prepared in a manner as described below by using the silicon nitride powder as a starting material.

The silicon nitride powder may be either $\alpha$-$Si_3N_4$ or $\beta$-$Si_3N_4$. The $\alpha$-$Si_3N_4$ is transformed into the $\beta$-$Si_3N_4$ through the firing that will be described later. It is further desired that the particle diameter of the silicon nitride powder is from 0.4 to 1.2 $\mu$m. Desirably, further, impurity oxygen (stemming chiefly from $SiO_2$) is contained in an amount of from 0.5 to 1.5% by weight.

The above silicon nitride powder is blended, as sintering additives, with a powder of an oxide ($RE_2O_3$) of an element of the Group 3a of periodic table and a powder of aluminum oxide ($Al_2O_3$). When the above-mentioned hard crystal phase is to be precipitated, there is mixed at least one of a tungsten oxide ($WO_3$) powder, a molybdenum oxide ($MoO_3$) powder, a copper oxide ($Cu_2O$) powder, a manganese oxide ($MnO_2$) powder, an iron oxide ($Fe_2O_3$) powder or a niobium oxide ($Nb_2O_5$) powder. These powders are mixed into the silicon nitride powder in such amounts that the composition of the obtained sintered product (corresponding to the composition of the mixture powder) satisfies the above-mentioned conditions. In this case, these oxides may be used in forms other than those expressed by the above chemical formulas, but their amounts of addition must be calculated based on the above chemical formulas. For example, Ce which is an element of the Group 3a of periodic table can be used as a $CeO_2$ powder, but its amount of addition is calculated as $Ce_2O_3$.

When the above-mentioned conditions are not satisfied by the excess amount of oxygen due to the use of the silicon nitride powder containing small amounts of impurity oxygen, the $SiO_2$ powder may be added so that the excess of oxygen satisfies the above-mentioned conditions.

The thus prepared mixture powder is blended with an organic solvent such as ethanol or isopropyl alcohol and with an organic binder such as polyvinyl alcohol, and is mixed and pulverized by using a ball mill, a vibration mill, a rotary mill or a barrel mill, and is molded into a predetermined shape by a known molding method such as mechanical press molding, cast molding, extrusion molding, injection molding, or cold isostatic pressure press molding. As required, in this case, the obtained molded article may be cut.

Next, the obtained molded article is fired by a known firing method such as normal pressure firing method or nitrogen gas-pressure firing method in a non-oxidizing atmosphere at a temperature of from 1700 to 1900° C. and, preferably, from 1750 to 1800° C. to obtain a densely sintered product having a relative density of not smaller than 95%, particularly, not smaller than 99% and, most preferably, not smaller than 99.5%. In this case, when the firing temperature is lower than the above range, it becomes difficult to obtain a densely sintered product. When the firing temperature is higher than the above range, on the other hand, the silicon nitride particles grow so conspicuously that the sintered product loses the strength at normal temperature.

The density of the thus obtained sintered product can be further increased by conducting the heat treatment in a nitrogen gas or an argon gas under a high pressure of not smaller than 1000 atoms, i.e., by conducting the so-called hot isostatic pressure firing (HIP).

It is further allowable to fill a firing pot with a mixture powder of $SiO_2$ and Si or a mixture powder of $SiO_2$ and silicon nitride, burying the molded article obtained above in the mixture powder, sealing the firing pot, and conducting the firing in an SiO-containing atmosphere. This method makes it possible to effectively suppress the decomposition of silicon nitride during the firing.

It is further allowable to prepare a molded article by replacing 10 to 80% by weight of the starting material by the silicon powder, conducting the heat treatment in a nitrogen atmosphere at 1000 to 1400° C. to transform the silicon powder into the silicon nitride, and conducting the above-mentioned firing.

The heat treatment for crystallizing the grain boundary phase is performed by two steps, i.e., promoting the formation of nuclei at 900 to 1000° C. and, then, growing the crystals at 1100 to 1200° C. This makes it possible to precipitate the above-mentioned various crystal phases, i.e., the crystal phase of $RE_2Si_3N_2O_5$ or $RE_3AlSi_2O_7N_2$, the hard crystal phase and the anti-oxidizing crystal phase on the grain boundaries, and to decrease the thickness of the amorphous phase. When the temperature of the first heat treatment is lower than 900° C., it becomes difficult to crystallize the grain boundary phase. When the temperature of the second heat treatment exceeds 1200° C., on the other hand, the grain boundaries are crystallized into other crystal phases. The heat treatment is conducted until the crystal phase is precipitated on the grain boundaries to a sufficient degree, e.g., until the thicknesses of the grain boundary amorphous phases 3 and 4 are decreased to satisfy the above-mentioned conditions. The atmosphere for conducting the heat treatment may be an oxidizing atmosphere in the open air or may be a non-oxidizing atmosphere such as of nitrogen or argon.

(Use)

The sintered product of silicon nitride of the present invention exhibits high strength over a wide temperature range of from normal temperature through up to high temperatures (1000° C.) as well as excellent static fatigue property, oxidation resistance and abrasion resistance, and can, hence, be very effectively utilized as parts for heat engines operated in a temperature range of from 800° C. to 1000° C., such as engine parts, e.g., piston crown, piston rings, cylinder liner, cylinder head, chamber, valves, turbo charger roller, exhaust port liner, etc., and gas turbine parts such as rotor, shroud, scroll, nozzles, seal rings, combustion cylinder, cells for a heat exchanger, etc.

EXAMPLES

Experiment 1

A powder of silicon nitride (BET specific surface area of 9 m$^2$/g, α coefficient of 92%, amount of oxygen of 1.0% by weight), a powder of an oxide (RE$_2$O$_3$) of an element of the Group 3a of periodic table, a powder of aluminum oxide (Al$_2$O$_3$) and a power of silicon dioxide (SiO$_2$) were mixed together as starting materials at such ratios that the compositions of the sintered products were as shown in Table 1. The mixture was then pulverized together with a solvent by using silicon nitride balls and were dried by using a spray drier and were granulated. The granules were introduced into a metal mold and was press-molded under a pressure of 1 ton/cm$^2$ to prepare a molded article.

The obtained molded article was introduced into a firing crucible made of silicon carbide, and was heated up to a firing temperature shown in Table 1 by using a carbon heater, held at this temperature for 5 hours, and was then cooled down to normal temperature to obtain a sintered product.

In order to crystallize the grain boundaries, further, the sintered product obtained above was heat-treated under the conditions shown in Table 1 to obtain an object sintered product of silicon nitride.

The main crystal phase of the obtained sintered product of silicon nitride and the crystal phases constituting the grain boundaries thereof were analyzed by the X-ray diffraction. Further, the sintered product of the silicon nitride were molded in a shape specified under JIS R 1601 to prepare test pieces which were then measured for their 4-point flexural strength, static fatigue property and oxidation resistance at room temperature and at 1000° C. in compliance with JIS R 1601 and 1604.

The thus obtained sintered product of silicon nitride was partly cut out, and was heat-treated in a nitrogen atmosphere at a temperature of 1100° C. for about 10 hours. Then, the surface of the sintered product of silicon nitride was polished to measure average thicknesses of the grain boundary amorphous phases 3 and 4 remaining between the silicon nitride crystal phases (SN—SN) 1 and between the silicon nitride crystal phase 1 and the grain boundary crystal phase 2 (SN—GBC) by using a transmission-type electron microscope (TEM). The measurement was taken from a lattice image at 10 measuring points at a magnification of 500,000 times.

By conducting the flexural testing in the open air at 1000° C., the static fatigue property was evaluated in time to failure when a predetermined stress of 700 MPa was exerted. Further, the oxidation resistance was evaluated relying upon an increase in the weight through the exposure testing in the open air at 1000° C. for 1000 hours.

The results were as shown in Table 2.

TABLE 1

| Sample No. | RE$_2$O$_3$ kind | RE$_2$O$_3$ % by wt. | Excess of O$_2$ (% by wt.) | Al$_2$O$_3$ % by wt. | Firing temp. (° C.) | Atmosphere Pressure (atm) | Heat tretment temp (° C.) | × hr (hr) | Al/RE | O/RE |
|---|---|---|---|---|---|---|---|---|---|---|
| 1 | Y$_2$O$_3$ | 8.1 | 1.7 | 2.9 | 1750 | 1.2 | 950 × 5, | 1150 × 10 | 0.36 | 0.21 |
| 2 | CeO$_3$ | 13 | 1.8 | 3.1 | 1750 | 1.2 | 950 × 5, | 1150 × 10 | 0.23 | 0.14 |
| 3 | Er$_2$O$_3$ | 13 | 1.6 | 2.8 | 1750 | 1.2 | 950 × 5, | 1150 × 10 | 0.22 | 0.12 |
| 4 | Yb$_2$O$_3$ | 13 | 1.6 | 2.8 | 1750 | 1.2 | 950 × 5, | 1150 × 10 | 0.21 | 0.12 |
| 5 | Lu$_2$O$_3$ | 13 | 1.6 | 2.8 | 1750 | 1.2 | 950 × 5, | 1150 × 10 | 0.21 | 0.12 |
| 6 | Y$_2$O$_3$ Sm$_2$O$_3$ | 4 6.1 | 1.7 | 2.9 | 1750 | 1.2 | X, Y, WSi$_2$ | | 0.29 | 0.17 |
| 7 | Y$_2$O$_3$ | 8.1 | 1.7 | 2.9 | 1650 | 1.2 | 950 × 5, | 1150 × 10 | 0.36 | 0.21 |
| 8 | Y$_2$O$_3$ | 8.1 | 1.7 | 2.9 | 1800 | 1.2 | 950 × 5, | 1150 × 10 | 0.36 | 0.21 |
| 9 | Y$_2$O$_3$ | 8.1 | 1.7 | 2.9 | 1750 | 1.2 | 950 × 5, | 1150 × 10 | 0.36 | 0.21 |
| 10 | Y$_2$O$_3$ | 8.1 | 1.7 | 2.9 | 1750 | 1.2 | 950 × 5 | | 0.36 | 0.21 |
| 11 | Y$_2$O$_3$ | 8.1 | 1.7 | 2.9 | 1800 | 10 | 950 × 10 | | 0.36 | 0.21 |
| *12 | Y$_2$O$_3$ | 8.1 | 1.7 | 2.9 | 1750 | 1.2 | no heat treatment | | 0.36 | 0.21 |
| *13 | Y$_2$O$_3$ | 13 | 1.3 | 1.4 | 1800 | 10 | 1000 × 10 | | 0.11 | 0.10 |
| *14 | Y$_2$O$_3$ | 10 | 1.3 | 1.8 | 1800 | 10 | 1000 × 10 | | 0.17 | 0.13 |
| *15 | Y$_2$O$_3$ | 10 | 1.3 | 1.8 | 1750 | 1.2 | 1000 × 10 | | 0.17 | 0.13 |
| *16 | Y$_2$O$_3$ | 8.1 | 1.7 | 2.9 | 1750 | 1.2 | 600 × 10 | | 0.36 | 0.21 |
| *17 | Y$_2$O$_3$ | 8.1 | 1.7 | 2.9 | 1750 | 1.2 | 1400 × 10 | | 0.36 | 0.21 |

*Comparative Example

TABLE 2

| Sample No. | Strength at normal temperature (MPa) | Strength at 1000° C. (MPa) | Static fatigue property (h) | Grain boundary crystal phase | Thickness of amorphous phase (nm) nm | nm | Peak ratio (β/α) |
|---|---|---|---|---|---|---|---|
| 1 | 1100 | 920 | >100 | X, Y | 0.8 | 2.3 | 0.2 |
| 2 | 1070 | 880 | >100 | X, Y | 0.8 | 2.2 | 0.2 |

TABLE 2-continued

| Sample No. | Strength at normal temperature (MPa) | Strength at 1000° C. (MPa) | Static fatigue property (h) | Grain boundary crystal phase | Thickness of amorphous phase (nm) | | Peak ratio (β/α) |
|---|---|---|---|---|---|---|---|
| | | | | | nm | nm | |
| 3 | 1100 | 890 | >100 | X, Y | 0.7 | 2.3 | 0.2 |
| 4 | 1090 | 880 | >100 | X, Y | 0.8 | 2.2 | 0.2 |
| 5 | 1110 | 870 | >100 | X, Y | 0.7 | 2.5 | 0.2 |
| 6 | 1080 | 870 | >100 | X, Y | 0.8 | 2.5 | 0.2 |
| 7 | 1060 | 860 | >100 | X, Y | 0.7 | 2.1 | 0.2 |
| 8 | 1000 | 900 | >100 | X, Y, Z | 0.8 | 2.3 | 0.2 |
| 9 | 1100 | 910 | >100 | X, Y | 0.7 | 2.3 | 0.2 |
| 10 | 1050 | 920 | >101 | X, Y | 0.8 | 2.2 | 0.2 |
| 11 | 1070 | 930 | >102 | X, Y | 0.8 | 2.4 | 0.2 |
| *12 | 1100 | 830 | 1 | — | 2.3 | 5.2 | — |
| *13 | 1040 | 820 | — | M | 2.5 | 5.5 | — |
| *14 | 1070 | 850 | 10 | W | 2.3 | 5.2 | — |
| *15 | 1150 | 880 | 20 | W | 2.3 | 5.3 | — |
| *16 | 1100 | 800 | 1 | — | 2.4 | 5.3 | — |
| *17 | 1090 | 870 | 10 | A | 2.5 | 5.3 | — |

*Comparative Example
X: $RE_2Si_3N_2O_5$
Y: $RE_3AlSi_2O_7N_2$
Z: $Al_2RE_4O_9$
M: melillite
W: wollastonite
A: apatite As shown in Tables 1 and 2, the samples Nos. 1 to 11 in which the crystal phase of $RE_2Si_3N_2O_5$ and/or $RE_3AlSi_2O_7N_2$ is precipitated on the grain boundaries and the thickness of the grain boundary amorphous phase is not larger than 2 nm between SN and SN and is not larger than 5 nm between SN and GBC, exhibit excellent properties such as strength at normal temperature of not smaller than 1000 MPa, strength at 1000° C. of not smaller than 850 MPa, time to failure representing the static fatigue property of not shorter than 100 hours at 1000° C. under 700 MPa, and an increase in the weight representing the oxidation resistance of not larger than 0.2 mg/cm².

On the other hand, the samples Nos. 12 and 16 in which the grain boundary phase has not been crystallized have time to failure representing the static fatigue property of as very short as one hour. Further, the samples Nos. 13 to 15 and 17 in which the grain boundaries have been crystallized into other crystal phases, melillite, wollastonite and apatite, have short time to failure, i.e., have poor static fatigue property and deteriorated anti-oxidizing property.

Experiment 2

A powder of silicon nitride (BET specific surface area of 9 m²/g, α coefficient of 92%, amount of oxygen of 1.0% by weight), a powder of an oxide ($REO_2$ or $RE_2O_3$) of an element of the Group 3a of periodic table, a powder of aluminum oxide ($Al_2O_3$), a powder of tungsten oxide ($WO_3$), a powder of molybdenum oxide ($MoO_3$), a powder of copper oxide ($Cu_2O$ or CuO), a powder of manganese oxide ($MnO_2$), a powder of iron oxide ($Fe_2O_3$), a powder of niobium oxide ($Nb_2O_5$) and a power of silicon dioxide ($SiO_2$) were mixed together as starting materials at such ratios that the compositions of the sintered products were as shown in Tables 3 and 4. The mixture was then pulverized together with a solvent by using silicon nitride balls and from which molded articles were prepared in the same manner as in Experiment 1 and were fired (1750° C. for 5 hours), followed by the heat treatment for crystallizing the grain boundaries to obtain sintered products of silicon nitride.

The grain boundaries were crystallized through the heat treatment under the conditions shown in Tables 3 and 4.

The obtained sintered products were analyzed by the X-ray diffraction, measured for their 4-point flexural strength and oxidation resistance in compliance with JIS R 1601 and 1604, and were measured for their static fatigue property in the same manner as in Experiment 1. The results were as shown in Tables 5 and 6.

The thickness of the amorphous phase on the grain boundaries was measured in the same manner as in Experiment 1.

Further, a plate was cut from the obtained sintered product, and grains of GC of #80 were blown thereto through a nozzle having an inner diameter of 10 mm with a pressure of 0.3 MPa for 3 minutes to measure the volume that was lost in order to evaluate the abrasion resistance. The results were as shown in Tables 5 and 6.

TABLE 3

| Sample No. | Composition | | | | | | Heat-treatment Temperature | |
|---|---|---|---|---|---|---|---|---|
| | SN (% by wt.) | $RE_2O_3$ kind | % by wt. | $SiO_2$ (% by wt.) | $Al_2O_3$ (% by wt.) | Additive kind | % by wt. | 1st (° C.) | 2nd (° C.) |
| 1 | 87.4 | $Y_2O_3$ | 7 | 2 | 3 | $WO_3$ | 0.6 | 800 | 1000 |
| 2 | 87.4 | $CeO_3$ | 7 | 2 | 3 | $WO_3$ | 0.6 | 800 | 1000 |

TABLE 3-continued

| Sample No. | SN (% by wt.) | RE₂O₃ kind | % by wt. | SiO₂ (% by wt.) | Al₂O₃ (% by wt.) | Additive kind | % by wt. | Heat-treatment Temperature 1st (° C.) | 2nd (° C.) |
|---|---|---|---|---|---|---|---|---|---|
| 3 | 87.4 | Er₂O₃ | 7 | 2 | 3 | WO₃ | 0.6 | 800 | 1000 |
| 4 | 87.4 | Yb₂O₃ | 7 | 2 | 3 | WO₃ | 0.6 | 800 | 1000 |
| 5 | 87.4 | Lu₂O₃ | 7 | 2 | 3 | WO₃ | 0.6 | 800 | 1000 |
| 6 | 87.4 | Y₂O₃ | 3.5 | 2 | 3 | WO₃ | 0.6 | 800 | 1000 |
|   |      | Sm₂O₃ | 3.5 |   |   |     |     | 800 | 1000 |
| 7 | 87.4 | Y₂O₃ | 7 | 2 | 3 | MoO₃ | 0.6 | 800 | 1000 |
| 8 | 87.4 | Y₂O₃ | 7 | 2 | 3 | Fe₂O₃ | 0.6 | 800 | 1000 |
| 9 | 87.4 | Y₂O₃ | 7 | 2 | 3 | Nb₂O₅ | 0.6 | 800 | 1000 |
| 10 | 87.4 | Y₂O₃ | 7 | 2 | 3 | WO₃ | 0.5 | 800 | 1000 |
|    |      |       |   |   |   | Cu₂O | 0.1 | 800 | 1000 |
| 11 | 87.4 | Y₂O₃ | 7 | 2 | 3 | WO₃ | 0.5 | 800 | 1000 |
|    |      |       |   |   |   | MnO₂ | 0.1 | 800 | 1000 |
| 12 | 86.5 | Y₂O₃ | 7 | 2 | 3 | WO₃ | 0.5 | 800 | 1000 |
|    |      |       |   |   |   | Fe₂O₃ | 1.0 | 800 | 1000 |
| 13 | 88.4 | Y₂O₃ | 6 | 2 | 3 | WO₃ | 0.6 | 800 | 1000 |
| 14 | 84.4 | Y₂O₃ | 10 | 2 | 3 | WO₃ | 0.6 | 800 | 1000 |
| 15 | 79.4 | Y₂O₃ | 12 | 3 | 5 | WO₃ | 0.6 | 800 | 1000 |
| 16 | 92.4 | Y₂O₃ | 4 | 1 | 2 | WO₃ | 0.6 | 800 | 1000 |
| 17 | 87.4 | Y₂O₃ | 7 | 2 | 3 | WO₃ | 0.6 | 800 | 1000 |
| 18 | 84.4 | Y₂O₃ | 7 | 5 | 3 | WO₃ | 0.6 | 800 | 1000 |
| 19 | 83.4 | Y₂O₃ | 7 | 6 | 3 | WO₃ | 0.6 | 800 | 1000 |

TABLE 4

| Sample No. | SN (% by wt.) | RE₂O₃ kind | % by wt. | SiO₂ (% by wt.) | Al₂O₃ (% by wt.) | Additive kind | % by wt. | Heat-treatment Temperature 1st (° C.) | 2nd (° C.) |
|---|---|---|---|---|---|---|---|---|---|
| 20 | 92.9 | Y₂O₃ | 41 | 1 | 1.5 | WO₃ | 0.6 | 800 | 1000 |
| 21 | 88.4 | Y₂O₃ | 7 | 2 | 2 | WO₃ | 0.6 | 800 | 1000 |
| 22 | 85.4 | Y₂O₃ | 7 | 2 | 5 | WO₃ | 0.6 | 800 | 1000 |
| 23 | 84.4 | Y₂O₃ | 7 | 2 | 6 | WO₃ | 0.6 | 800 | 1000 |
| *24 | 88.0 | Y₂O₃ | 7 | 2 | 3 | — | 0.0 | 800 | 1000 |
| 25 | 87.5 | Y₂O₃ | 7 | 2 | 3 | WO₃ | 0.5 | 800 | 1000 |
| 26 | 85.0 | Y₂O₃ | 7 | 2 | 3 | WO₃ | 3.0 | 800 | 1000 |
| 27 | 83.0 | Y₂O₃ | 7 | 2 | 3 | WO₃ | 5.0 | 800 | 1000 |
| 28 | 87.4 | Y₂O₃ | 7 | 2 | 3 | WO₃ | 0.6 | 800 | 1000 |
| 29 | 87.4 | Y₂O₃ | 7 | 2 | 3 | WO₃ | 0.6 | 800 | 1000 |
| 30 | 87.4 | Y₂O₃ | 7 | 2 | 3 | WO₃ | 0.6 | 800 | 1000 |
| 31 | 87.4 | Y₂O₃ | 7 | 2 | 3 | WO₃ | 0.6 | 800 | 1000 |
| 32 | 87.4 | Y₂O₃ | 7 | 2 | 3 | WO₃ | 0.6 | 800 | 1000 |
| 33 | 87.4 | Y₂O₃ | 7 | 2 | 3 | WO₃ | 0.6 | 800 | 1000 |
| 34 | 87.4 | Y₂O₃ | 7 | 2 | 3 | WO₃ | 0.6 | 800 | 1000 |
| 35 | 87.4 | Y₂O₃ | 7 | 2 | 3 | WO₃ | 0.6 | 800 | 1000 |
| 36 | 87.4 | Y₂O₃ | 7 | 2 | 3 | WO₃ | 0.6 | 800 | 1000 |
| 37 | 87.4 | Y₂O₃ | 7 | 2 | 3 | WO₃ | 0.6 | 800 | 1000 |
| 38 | 87.4 | Y₂O₃ | 7 | 2 | 3 | WO₃ | 0.6 | 800 | 1000 |
| *39 | 87.4 | Y₂O₃ | 7 | 2 | 3 | WO₃ | 0.6 | 800 | 600 |
| *40 | 87.4 | Y₂O₃ | 7 | 2 | 3 | WO₃ | 0.6 | 800 | 1400 |
| *41 | 93.4 | Y₂O₃ | 1 | 2 | 3 | WO₃ | 0.6 | 800 | 1000 |
| *42 | 79.4 | Y₂O₃ | 15 | 2 | 3 | WO₃ | 0.6 | 800 | 1000 |
| *43 | 89.3 | Y₂O₃ | 7 | 0.1 | 3 | WO₃ | 0.6 | 800 | 1000 |
| *44 | 82.4 | Y₂O₃ | 7 | 7 | 3 | WO₃ | 0.6 | 800 | 1000 |
| *45 | 83.4 | Y₂O₃ | 7 | 2 | 7 | WO₃ | 0.6 | 800 | 1000 |

*Comparative Example

TABLE 5

| Sample No. | Grain boundary crystal phase | Peak ratio (β/α) | H-particle diameter (μm) | Relative density (%) | Thickness of amorphous phase SN—SN (nm) | Thickness of amorphous phase SN-GBC (nm) | Strength Normal temp. (MPa) | Strength High temp. (MPa) | Static fatigue orioerty (h) | Oxidation resistance (mg/cm$^2$) | Abrasion resistance (mm$^3$) |
|---|---|---|---|---|---|---|---|---|---|---|---|
| 1 | X, Y, WSi$_2$ | 0.2 | 1 | 99.5 | 0.8 | 2.1 | 1100 | 920 | >100 | 0.15 | 8.9 |
| 2 | X, Y, WSi$_2$ | 0.2 | 1 | 99.5 | 0.8 | 2.2 | 1050 | 870 | >100 | 0.17 | 9.0 |
| 3 | X, Y, WSi$_2$ | 0.2 | 1 | 99.5 | 0.7 | 2.1 | 1110 | 930 | >100 | 0.13 | 9.0 |
| 4 | X, Y, WSi$_2$ | 0.2 | 1 | 99.5 | 0.7 | 2.3 | 1070 | 930 | >100 | 0.12 | 9.0 |
| 5 | X, Y, WSi$_2$ | 0.2 | 1 | 99.5 | 0.7 | 2.3 | 1030 | 940 | >100 | 0.11 | 9.2 |
| 6 | X, Y, WSi$_2$ | 0.2 | 1 | 99.5 | 0.8 | 2.4 | 1150 | 860 | >100 | 0.15 | 8.8 |
| 7 | X, Y, MoSi$_2$ | 0.2 | 1 | 99.5 | 0.8 | 2.2 | 1090 | 920 | >100 | 0.16 | 9.0 |
| 8 | X, Y, FeSi$_2$ | 0.2 | 1 | 99.5 | 0.7 | 2.4 | 1080 | 920 | >100 | 0.14 | 8.8 |
| 9 | X, Y, NbC | 0.2 | 1 | 99.5 | 0.8 | 2.3 | 1100 | 940 | >100 | 0.16 | 8.8 |
| 10 | X, Y, WSi$_2$ | 0.2 | 1 | 99.5 | 0.8 | 2.4 | 1140 | 920 | >100 | 0.15 | 9.0 |
| 11 | X, Y, WSi$_2$ | 0.2 | 1 | 99.5 | 0.7 | 2.3 | 1090 | 900 | >100 | 0.14 | 9.1 |
| 12 | X, Y, WSi$_2$ FeSi$_2$ | 0.2 | 1 | 99.5 | 0.7 | 2.5 | 1150 | 930 | >100 | 0.15 | 8.7 |
| 13 | X, Y, WSi$_2$ | 0.2 | 1 | 99.5 | 0.8 | 2.3 | 1030 | 850 | >100 | 0.14 | 9.0 |
| 14 | X, Y, WSi$_2$ | 0.2 | 1 | 99.5 | 0.7 | 2.3 | 1090 | 860 | >100 | 0.17 | 9.2 |
| 15 | X, Y, WSi$_2$ | 0.2 | 1 | 99.5 | 1.1 | 3.5 | 1090 | 850 | 55 | 0.20 | 12.0 |
| 16 | X, Y, WSi$_2$ | 0.2 | 1 | 98.0 | 1.3 | 3.8 | 1010 | 880 | 50 | 0.20 | 12.0 |
| 17 | X, Y, WSi$_2$ | 0.2 | 1 | 99.5 | 0.8 | 2.3 | 1080 | 890 | >100 | 0.14 | 9.0 |
| 18 | X, Y, WSi$_2$ | 0.2 | 1 | 99.5 | 0.7 | 2.5 | 1080 | 890 | >100 | 0.14 | 8.9 |
| 19 | X, Y, WSi$_2$ | 0.2 | 1 | 99.5 | 1.2 | 3.7 | 1070 | 880 | 56 | 0.10 | 10.5 |

TABLE 6

| Sample No. | Grain boundary crystal phase | Peak ratio (β/α) | H-particle diameter (μm) | Relative density (%) | Thickness of amorphous phase SN—SN (nm) | Thickness of amorphous phase SN-GBC (nm) | Strength Normal temp. (MPa) | Strength High temp. (MPa) | Static fatigue property (h) | Oxidation resistance (mg/cm$^2$) | Abrasion resistance (mm$^3$) |
|---|---|---|---|---|---|---|---|---|---|---|---|
| 20 | X, Y, WSi$_2$ | 0.2 | 1 | 99.0 | 1.1 | 3.2 | 1000 | 830 | 50 | 0.20 | 14.5 |
| 21 | X, Y, WSi$_2$ | 0.2 | 1 | 99.5 | 0.8 | 2.2 | 1050 | 850 | >100 | 0.18 | 9.5 |
| 22 | X, Y, WSi$_2$ | 0.2 | 1 | 99.5 | 0.9 | 2.4 | 1080 | 880 | >100 | 0.17 | 9.2 |
| 23 | X, Y, WSi$_2$ | 0.2 | 1 | 99.5 | 1.2 | 4.1 | 1000 | 870 | 50 | 0.18 | 11.0 |
| *24 | X, Y | 0.2 | 1 | 99.5 | 0.8 | 2.3 | 1090 | 890 | >100 | 0.15 | 21.0 |
| 25 | X, Y, WSi$_2$ | 0.2 | 1 | 99.5 | 0.8 | 2.5 | 1080 | 900 | >100 | 0.15 | 9.2 |
| 26 | X, Y, WSi$_2$ | 0.2 | 1 | 99.5 | 0.8 | 2.5 | 1100 | 880 | >100 | 0.18 | 9.0 |
| 27 | X, Y, WSi$_2$ | 0.2 | 1 | 99.5 | 0.8 | 2.6 | 1090 | 840 | >100 | 0.20 | 9.0 |
| 28 | X, Y, WSi$_2$ | 0.005 | 1 | 99.5 | 1.1 | 3.5 | 1100 | 800 | 50 | 0.19 | 9.2 |
| 29 | X, Y, WSi$_2$ | 0.01 | 1 | 99.5 | 0.8 | 2.2 | 1100 | 850 | >100 | 0.16 | 9.1 |
| 30 | X, Y, WSi$_2$ | 0.1 | 1 | 99.5 | 0.9 | 2.1 | 1100 | 900 | >100 | 0.15 | 9.0 |
| 31 | X, Y, WSi$_2$ | 0.2 | 0.7 | 99.5 | 0.8 | 2.3 | 1120 | 920 | >100 | 0.15 | 8.6 |
| 32 | X, Y, WSi$_2$ | 0.2 | 2 | 99.5 | 0.7 | 2.5 | 1070 | 900 | >100 | 0.15 | 9.0 |
| 33 | X, Y, WSi$_2$ | 0.2 | 3 | 99.5 | 0.8 | 2.2 | 1030 | 880 | >100 | 0.15 | 9.1 |
| 34 | X, Y, WSi$_2$ | 0.2 | 4 | 99.5 | 1.1 | 3.2 | 1030 | 850 | 80 | 0.15 | 9.8 |
| 35 | X, Y, WSi$_2$ | 0.2 | 1 | 98.8 | 1.2 | 4.2 | 1000 | 800 | 50 | 0.20 | 10.0 |
| 36 | X, Y, WSi$_2$ | 0.2 | 1 | 99.0 | 0.9 | 2.1 | 1080 | 870 | >100 | 0.17 | 9.2 |
| 37 | X, Y, WSi$_2$ | 0.2 | 1 | 99.8 | 0.8 | 2.5 | 1120 | 930 | >100 | 0.14 | 8.9 |
| 38 | X, Y, Z, WSi$_2$ | 0.2 | 1 | 99.5 | 0.8 | 2.3 | 1130 | 930 | >100 | 0.13 | 8.90 |
| *39 | G, WSi$_2$ | — | 1 | 99.5 | 2.2 | 5.2 | 1020 | 800 | 2 | 0.17 | 9.3 |
| *40 | A | — | 1 | 99.5 | 2.3 | 5.3 | 1090 | 870 | 10 | 0.25 | 17.0 |
| *41 | G, WSi$_2$ | — | 1 | 96.5 | 2.5 | 5.3 | 890 | 650 | 1 | 0.25 | 30.0 |
| *42 | W, WSi$_2$ | — | 1 | 99.3 | 2.5 | 5.5 | 1100 | 750 | 2 | 0.50 | 15.0 |
| *43 | M, WSi$_2$ | — | 1 | 99.4 | 2.3 | 5.6 | 1080 | 700 | 1 | 0.53 | 16.0 |
| *44 | D, WSi$_2$ | — | 1 | 99.0 | 2.2 | 5.7 | 1000 | 730 | 30 | 0.10 | 10.0 |
| *45 | G, WSi$_2$ | — | 1 | 99.5 | 2.3 | 5.5 | 980 | 650 | 1 | 0.25 | 12.0 |

*Comparative Example

In Tables 5 and 6, symbols X, Y, Z, A, W and M in the grain boundary crystal phase represent crystal phases as shown in Table 2, and D represents disilicate. Further, a peak ratio (β/α) represents a peak intensity ratio of the diffraction peak (β) of RE$_2$Si$_3$N$_2$O$_5$ (211) or RE$_3$AlSi$_2$O$_7$N$_2$ (102) to the diffraction peak (α) of Si$_3$N$_4$ (200). The H-particle diameter represents the diameter of crystal particles of a nitride, carbide or silicide containing at least one kind of hard element selected from W, Mo, Cu, Mn, Fe and Nb. It will be understood from the experimental results of Table 6 that the samples Nos. 1 to 23 and 25 to 38 containing an oxide of a hard element were abraded by volumes of as small as 15 mm³ or less, exhibiting improved abrasion resistance.

What is claimed is:

1. A sintered product of silicon nitride comprising a silicon nitride crystal phase, wherein a crystal phase of $RE_2Si_3N_2O_5$ or $RE_3AlSi_2O_7N_2$ (RE is an element of the Group 3a of periodic table) is precipitated on the grain boundaries of the silicon nitride crystal phase.

2. A sintered product of silicon nitride according to claim 1, wherein said sintered product has an X-ray diffraction image with an intensity ratio ($\beta/\alpha$) of the peak intensity ($\beta$) of $RE_2Si_3N_2O_5$ (211) or $RE_3AlSi_2O_7N_2$ (102) to the peak intensity ($\alpha$) of $Si_3N_4$ (200) of not smaller than 0.01.

3. A sintered product of silicon nitride according to claim 1, wherein a crystal phase of a nitride, carbide or silicide of at least one kind of element selected from the group consisting of W, Mo, Cu, Mn, Fe and Nb is further precipitated on the grain boundary of the silicon nitride crystal phase.

4. A sintered product of silicon nitride according to claim 3, wherein the crystal particles of said nitride, carbide or silicide has an average particle diameter of not larger than 3 $\mu$m.

5. A sintered product of silicon nitride according to claim 1, wherein a crystal phase of $Al_2RE_4O_9$ is further precipitated on the grain boundary of the silicon nitride crystal phase.

6. A sintered product of silicon nitride according to claim 1, wherein said sintered product has a relative density of not smaller than 99%.

7. A sintered product of silicon nitride according to claim 1, wherein the element (RE) of the Group 3a of periodic table is contained in an amount of from 2 to 14% by weight calculated as $RE_2O_3$ and Al is contained in an amount of from 2 to 5% by weight calculated as aluminum oxide.

8. A sintered product of silicon nitride according to claim 7, wherein a ratio ($Al_2O_3/RE_2O_3$) of the content of Al calculated as aluminum oxide to the content of the element (RE) of the Group 3a of periodic table calculated as $RE_2O_3$ is from 0.2 to 0.8.

9. A sintered product of silicon nitride according to claim 7, wherein excess of oxygen is contained in a amount of from 0.5 to 5% by weight calculated as $SiO_2$.

10. A sintered product of silicon nitride according to claim 9, wherein a ratio ($SiO_2/RE_2O_3$) of the content of excess of oxygen calculated as $SiO_2$ to the content of the element (RE) of the Group 3a of periodic table calculated as $RE_2O_3$ is from 0.2 to 0.75.

11. A sintered product of silicon nitride according to claim 9, wherein at least one kind of element selected from the group consisting of W, Mo, Cu, Mn, Fe and Nb is contained in an amount of from 0.5 to 5 parts by weight calculated as an oxide per 100 parts by weight of the total amount of silicon nitride, element (RE) of the Group 3a of periodic table, Al and excess of oxygen.

12. A sintered product of silicon nitride according to claim 1, wherein an amorphous phase of an element (RE) of the Group 3a of periodic table, silicon (Si), Al, oxygen (O) and nitrogen, is precipitated on the grain boundaries of the silicon nitride crystal phase, the average thickness of said amorphous phase existing between the crystal phases of silicon nitride being not larger than 2 nm and the average thickness of the amorphous phase existing between the silicon nitride crystal phase and the grain boundary crystal phase being not larger than 5 nm.

13. A part for a heat engine formed of a sintered product of silicon nitride of claim 1.

* * * * *